United States Patent
Daly et al.

(10) Patent No.: US 6,777,027 B2
(45) Date of Patent: Aug. 17, 2004

(54) COATING POWDERS FOR SMOOTH, LOW GLOSS FINISHES, AND POWDER COATINGS FORMED THEREFROM

(75) Inventors: Andrew T. Daly, Sinking Spring, PA (US); Eugene P. Reinheimer, Wyomissing, PA (US); Richard P. Haley, Reading, PA (US); Navin B. Shah, Sinking Spring, PA (US); Richard A. Kraski, Jr., Pittsburgh, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 10/267,558

(22) Filed: Oct. 8, 2002

(65) Prior Publication Data

US 2004/0067304 A1 Apr. 8, 2004

(51) Int. Cl.$^7$ .................................................. B05D 1/12
(52) U.S. Cl. ....................... 427/180; 522/100; 522/102; 522/103; 522/104; 522/107; 427/580
(58) Field of Search ................................ 427/180, 508; 522/100, 102, 103, 104, 107

(56) References Cited

U.S. PATENT DOCUMENTS

| | | | |
|---|---|---|---|
| 5,789,039 A | 8/1998 | Biller et al. | 427/508 |
| 5,824,373 A | 10/1998 | Biller et al. | 427/474 |
| 5,922,473 A | 7/1999 | Muthiah et al. | 428/481 |
| 6,005,017 A | 12/1999 | Daly et al. | 522/20 |
| 6,017,593 A | 1/2000 | Daly et al. | 427/559 |
| 6,028,212 A | 2/2000 | Shah et al. | 560/115 |
| 6,054,250 A | 4/2000 | Sitzmann et al. | 430/280.1 |
| 6,136,882 A | 10/2000 | Daly et al. | 522/107 |
| 6,235,228 B1 | 5/2001 | Nicholl et al. | 264/255 |
| 6,294,610 B1 | 9/2001 | Daly et al. | 525/119 |
| 6,348,242 B1 | 2/2002 | Daly et al. | 427/558 |
| 6,350,792 B1 * | 2/2002 | Smetana | 522/81 |

FOREIGN PATENT DOCUMENTS

| | | |
|---|---|---|
| EP | 0 636 669 A2 | 2/1995 |
| WO | WO 98/36323 | 8/1998 |

OTHER PUBLICATIONS

Sitzmann, E. V. et al, "Combining vinyl ethers with acrylates for enhanced performance in UV cured coatings"; AlliedSignal Inc., Preprint of article to be presented at RadTech '98 (Chicago) 4/98.

Misey,T. A., van der Linde, R., "Powder coatings technology: new developments at the turn of the century"; Progress in Organic Coatings (34); Elsevier Science S.A.; pp. 160–168, 1998.

\* cited by examiner

*Primary Examiner*—Philip Tucker
*Assistant Examiner*—D. Aylward
(74) *Attorney, Agent, or Firm*—Andrew E. C. Merriam

(57) ABSTRACT

The present invention provides UV curable coating powders comprising a blend of one or more than one free radical curable resin and one or more than one cationic curable resin, at least one free radical photoinitiator and at least one cationic photoinitiator, including suitable cross-linking agents and additives to enhance the chemical and physical properties of the coating appearance. The coating powder, preferably finely ground to between 5 and 30 microns in average particle size, is applied to a substrate, heat fused, and cured for an amount of time sufficient to form a powder coating having a low gloss finish.

10 Claims, No Drawings

COATING POWDERS FOR SMOOTH, LOW GLOSS FINISHES, AND POWDER COATINGS FORMED THEREFROM

BACKGROUND

This disclosure relates to ultraviolet radiation curable powders and, more particularly, to coating powders that give powder coatings having a smooth, low gloss finish, and powder coatings formed thereby.

Thermosetting coating powders are dry, finely divided, free-flowing solid materials at room temperature. Coating powders find particular utility in industrial coating applications because they are readily applied to a variety of conductive substrates, they use very little (or no) organic solvents, and excess coating powders can be readily recycled.

One class of curable coating powders is ultraviolet (UV) radiation curable powders. UV curable powders have the ability to flow, cure, and produce smoother coatings at much lower temperatures than previously possible with traditional thermosetting chemistry. This is primarily due to the curing reaction being triggered by photoinitiated radiation rather than heat. Typically, UV curable powders are formulated from solid unsaturated base resins with low glass transition temperatures ($T_g$), such as unsaturated polyesters, unsaturated co-polymerizable cross linking resins such as vinyl ethers, photoinitiators, flow and leveling agents, performance-enhancing additives, and, optionally, pigments and fillers.

During coating operations, the parts are preferably preheated to drive out substrate volatiles, then UV curable powders are applied to a substrate, usually using electrostatic spray techniques. The coated substrate is then heated to fuse the powders into a smooth molten coating. The coating is then exposed to UV light, which cures and hardens the coating into a durable, extraordinarily smooth, attractive coating. However, because of the very rapid cure of UV curable coatings, it has been difficult to obtain a low gloss, smooth UV cured coating and the coatings so formed tend to have a relatively high glossy appearance. For reasons of aesthetic preference and commercial application, low gloss coatings are desirable for certain applications.

Generally, gloss reduction can be obtained in traditional powder coatings through the introduction of matting agents, such as fillers or waxes, which rise to the surface during curing and cause matting through disruption of the surface of the coating. However, because UV curable powders cure so quickly, there is not adequate time for the fillers and waxes to flocculate to the surface, and they become trapped within the coating. There is reduction in flow in the coating but little matting takes place. Higher amounts of filler or waxes may be used, but this tends to cause the powders to block or cake during normal storage and/or produce coatings with severe orange peel, limiting the amount of gloss reduction that could be attained.

U.S. Pat. No. 6,348,242 discloses UV curable powder coatings containing crystalline components, wherein the heat fused powder is further heated to flow out the crystalline components, followed by cooling to recrystallize them to form a low gloss finish prior to UV curing the coating. However, the coating powders thus formed do not include cationic curable resins and, accordingly, the film continuity and smoothness or appearance properties of the coatings formed from the powders of U.S. Pat. No. 6,348,242 should desirably be improved.

Accordingly, there remains a need for UV curable powders that form powder coatings with a low gloss. In accordance with the present invention, the present inventors have found powders that are resistant to blocking and that give surprisingly durable, low gloss, smooth UV cured powder coatings.

STATEMENT OF INVENTION

In a first aspect, the present invention provides a coating powder comprising one or more than one or more than one cationic curable resin; one or more than one cationic photoinitiator; one or more than one free radical curable resin; and one or more than one free radical photoinitiator, wherein the cationic curable resin and the free radical curable resin are each present in a ratio of 95:5 to 5:95. In a second aspect, the present invention provides a method of making a coating, comprising disposing a layer of the coating powder according to the first aspect of the present invention onto a substrate; fusing the disposed powder layer with heat to form a powder coating; and curing the powder coating to achieve a gloss level of below 60 on a Gardner Gloss scale. In a third aspect, a powder coated article is made according to the method of the second aspect of the present invention.

DETAILED DESCRIPTION

For purposes of better defining the coating powder and powder coating, the coating powder, powder or powder coating composition refers herein to the particulate material, and the powder coating refers to the coating applied to a substrate or article. An improved coating powder that provides coatings having a low gloss appearance, preferably below 60 on a 60° Gardner Gloss scale, comprises a blend of a cationic curable resin with a free radical curing resin, together with photoinitiators effective to initiate polymerization, wherein the weight ratio of the cationic curable resin to free radical curable resin is 95:5 to 5:95. Additional components such as heat-activated catalysts, pigments, fillers, flow control agents, dry flow additives, anticratering agents, surfactants, texturing agents, light stabilizers, matting agents, photosensitizers, wetting agents, anti-oxidants, plasticizers, opacifiers, stabilizers, and degassing agents can also be present. More particularly, low gloss luster can be achieved without the use of additives and/or fillers that can cause the resultant coating to cake and/or peel.

The coating powder composition employs a combination of resins having different curing mechanisms: cationic and free radical. The resin itself is typically a polymer, oligomer, or monomer that has at least two unreacted functional groups capable of crosslinking, polymerizing, or other reaction that leads to the coating. In cationic curing mechanisms, the reactive functionality of the resin reacts in the curing step by means of positively charged chemical species. In free radical curing mechanisms, the reactive functionality of the resin reacts during cure by means of free radical (uncharged) intermediate species.

Cationic curable resins may generally comprise, for example, epoxides, vinyl ethers, oxetanes, oxolanes, cyclic acetals, cyclic lactones, thiiranes, or thiotanes, or combinations comprising at least one of the foregoing resins. Preferably, the cationic curable resin comprises a polyglycidyl compound, a cycloaliphatic polyepoxide, an epoxy cresol novolac, or an epoxy phenol novolac compound, having, on average, at least two epoxy groups (oxirane rings) in the molecule. Such resins may have an aliphatic, aromatic, cycloaliphatic, araliphatic or heterocyclic structure; they contain epoxide groups as side groups, or these groups form part of an alicyclic or heterocyclic ring system. Epoxy resins of these types are known in general terms and are commercially available.

Polyglycidyl esters and poly(β-methylglycidyl) esters are one example of suitable epoxy resins. Polyglycidyl esters can be obtained by reacting a compound having at least two carboxyl groups in the molecule with epichlorohydrin or glycerol dichlorohydrin or β-methylepichlorohydrin. The reaction is expediently carried out in the presence of bases. The compounds having at least two carboxyl groups in the molecule can be, for example, aliphatic polycarboxylic acids, such as glutaric acid, adipic acid, pimelic acid, suberic acid, azelaic acid, sebacic acid or dimerized or trimerized linoleic acid. It is also possible to employ cycloaliphatic polycarboxylic acids, for example tetrahydrophthalic acid, 4-methyltetrahydrophthalic acid, hexahydrophthalic acid, or 4-methylhexahydrophthalic acid. It is also possible to use aromatic polycarboxylic acids such as, for example, phthalic acid, isophthalic acid, trimellitic acid or pyromellitic acid, or else carboxyl-terminated adducts, for example of trimellitic acid and polyols, for example glycerol or 2,2-bis(4-hydroxycyclohexyl)propane, can be used.

Polyglycidyl ethers or poly(β-methylglycidyl) ethers can likewise be used. The polyglycidyl ethers can be obtained by reacting a compound having at least two free alcoholic hydroxyl groups and/or phenolic hydroxyl groups with a suitably substituted epichlorohydrin under alkaline conditions or in the presence of an acidic catalyst followed by alkali treatment. Ethers of this type are derived, for example, from acyclic alcohols, such as ethylene glycol, diethylene glycol and higher poly(oxyethylene) glycols, propane-1,2-diol, or poly(oxypropylene) glycols, propane-1,3-diol, butane-1,4-diol, poly(oxytetramethylene) glycols, pentane-1,5-diol, hexane-2,4,6-triol, glycerol, 1,1,1-trimethylolpropane, bistrimethylolpropane, pentaerythritol, sorbitol, and from polyepichlorohydrins. Exemplary glycidyl ethers can also be obtained from cycloaliphatic alcohols such as 1,3- or 1,4-dihydroxycyclohexane, bis(4-hydroxycyclo-hexyl)methane, 2,2-bis(4-hydroxycyclohexyl)propane or 1,1-bis(hydroxymethyl)cyclohex-3-ene, or they possess aromatic rings, such as N,N-bis(2-hydroxyethyl)aniline or p,p'-bis(2-hydroxyethylamino)diphenylmethane.

Other exemplary polyglycidyl ethers or poly(β-methylglycidyl) ethers are based on phenols; either on monocylic phenols, for example on resorcinol or hydroquinone, or on polycyclic phenols, for example on bis(4-hydroxyphenyl)methane (bisphenol F), 2,2-bis(4-hydroxyphenyl)propane (bisphenol A), or on condensation products, obtained under acidic conditions, of phenols or cresols with formaldehyde, such as phenol novolaks and cresol novolaks.

Poly(N-glycidyl) compounds may also be used, being obtained, for example, by dehydrochlorination of the reaction products of epichlorohydrin with amines containing at least two amine hydrogen atoms. These amines may, for example, be n-butylamine, aniline, toluidine, m-xylylenediamine, bis(4-aminophenyl)methane or bis(4-methylaminophenyl)methane. Other examples of poly(N-glycidyl) compounds include N,N'-diglycidyl derivatives of cycloalkyleneureas, such as ethyleneurea or 1,3-propyleneurea, and N,N'-diglycidyl derivatives of hydantoins, such as of 5,5-dimethylhydantoin. Poly(S-glycidyl) compounds may also be useful, examples being di-S-glycidyl derivatives derived from dithiols, for example ethane-1,2-dithiol or bis(4-mercaptomethylphenyl) ether.

Suitable epoxide compounds in which the epoxide groups form part of an alicyclic or heterocyclic ring system include, for example, bis(2,3-epoxycyclopentyl) ether, 2,3-epoxycyclopentyl glycidyl ether, 1,2-bis(2,3-epoxycyclopentyloxy)ethane, bis(4-hydroxycyclohexyl) methane diglycidyl ether, 2,2-bis(4-hydroxycyclohexyl) propane diglycidyl ether, 3,4-epoxycyclohexyl-methyl 3,4-epoxycyclohexanecarboxylate, 3,4-epoxy-6-methyl-cyclohexylmethyl 3,4-epoxy-6-methylcyclohexanecarboxylate, di(3,4-epoxycyclohexylmethyl) hexanedioate, di(3,4-epoxy-6-methylcyclohexylmethyl) hexanedioate, ethanediol di(3,4-epoxycyclohexylmethyl)ether, vinylcyclohexene dioxide, dicyclopentadiene diepoxide or 2-(3,4-epoxycyclohexyl-5,5-spiro-3,4-epoxy) cyclohexane-1,3-dioxane.

Suitable epoxy resins in which the 1,2-epoxide groups are attached to different heteroatoms or functional groups include, for example, the N,N,O-triglycidyl derivative of 4-aminophenol, the glycidyl ether/glycidyl ester of salicylic acid, N-glycidyl-N'-(2-glycidyloxypropyl)-5,5-dimethylhydantoin or 2-glycidyloxy-1,3-bis(5,5-dimethyl-1-glycidylhydantoin-3-yl)propane.

Preferred epoxides include, for example, aromatic epoxides including groups such as bisphenol A, bisphenol F, bisphenol S, and the like, as generally illustrated in Formula (1):

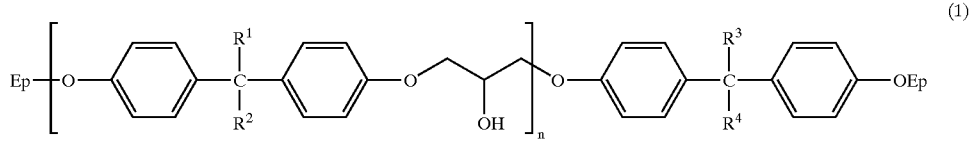

(1)

wherein $R^1$, $R^2$, $R^3$, and $R^4$ is each independently an aliphatic $C_1$-$C_6$ hydrocarbon or fluorohydrocarbon, preferably methyl; n=1–4; and Ep is an epoxide generally comprising the following structure (2):

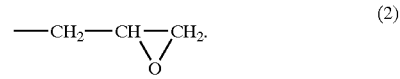

(2)

Suitable commercial epoxide resins are exemplified by solid bisphenol A epoxy resins available under the trade names "GT-9013", "GT-7072" and "GT-6259", from Vantico.

Vinyl ethers generally have the following formula (3)

(3)

wherein $R^4$ is an aliphatic, aromatic, cycloaliphatic, araliphatic or heterocyclic group, optionally further comprising one or more than one functional group such as ether, polyether, ester, polyester, urethane, polyurethane, or a combination comprising at least one of the foregoing groups or functional groups; and n=1–10, preferably 2–4.

Suitable vinyl ethers include, for example, ethyl vinylether, n-propyl vinylether, isobutyl vinylether, octadecyl vinylether, cyclohexyl vinylether, cyclohexanedimethanol divinylether, diethyleneglycol divinylether, tert-amyl vinylether, dodecyl vinylether, ethyleneglycol divinylether, hexanediol divinylether, triethyleneglycol methylvinylether, tetraethyleneglycol divinylether, trimethylolpropane trivinylether, aminopropyl vinylether, diethylaminoethyl vinylether, polyalkylene glycol divinyl ether, divinyl ether terephthalates such as bis(4-ethenyloxy)butyl) terephthalate, bis(4-ethenyloxy)butyl) 1,3-benzendicarboxylate, and tris (4-(ethenyloxy)butyl). Commercial chain extended vinyl ethers include the Pluriol-E200 divinyl ether (PEG200-DVE), poly-THF290 divinylether (PTHF290-DVE) and polyethyleneglycol-520 methyl vinylether (MPEG500-VE) from BASF Corp. Hydroxyl-functionalized vinylethers include butanediol monovinylethers, cyclohexanedimethanol monovinylether, ethyleneglycol monovinylether, hexanediol monovinylether, polyethyleneglycol monovinylethers.

Suitable oxetane compounds include, for example, trimethylene oxide, 3,3-dimethyloxetane, 3,3-dichloromethyloxethane, 3-ethyl-3-phenoxymethyloxetane, or bis(3-ethyl-3-methyloxy)butane. Suitable oxolane compounds include, for example, tetrahydrofuran or 2,3-dimethyltetrahydrofuran. Suitable cyclic acetal compounds include, for example, trioxane or 1,3-dioxolane. Suitable cyclic lactone compounds include, for example, beta-propiolactone or epsilon-caprolactone. Suitable thiirane compounds include, for example, ethylene sulfide, 1,2-propylene sulfide or thioepichlorohydrin. Suitable thiotane compounds include, for example, 1,3-propylene sulfide or 3,3-dimethylthiothane.

The above cationically polymerizable resins may be used alone or as a mixture of two or more thereof, depending upon the desired performance.

The coating powder according to the present invention also includes one or more than one cationic photoinitiator to affect a radiation-triggered cure of the above-described resins. Suitable cationic photoinitiators include, for example, onium salts, aromatic diazonium salts of complex halides, certain metallocenes, or a combination comprising at least one of the foregoing initiators.

Suitable onium salts include, for example, those having the formulas $R_2I^+MX_z^-$, $R_3S^+MX_z^-$, $R_3Se^+MX_z^-$, $R_4P^+MX_z^-$, and $R_4N^+MX_z^-$, wherein each R is an organic group having from 1 to 30 carbon atoms, for example aromatic carbocyclic groups having from 6 to 20 carbon atoms. Each R group can be substituted with from 1 to 4 monovalent hydrocarbon groups, for example alkoxy groups having from 1 to 8 carbon atoms, alkyl groups having from 1 to 16 carbon atoms, nitro, chloro, bromo, cyano, carboxyl, mercapto, or aromatic heterocyclic groups exemplified by pyridyl, thiophenyl, and pyranyl. $MX_z^-$ is a non-basic, non-nucleophilic anion, for example an inorganic anion such as $BF_4^-$, $B(C_6F_5)_4^-$, $PF_6^-$, $AsF_6^-$, $SbF_6^-$, $SbCl_6^-$, $HSO_4^-$, $ClO_4^-$, $FeCl_4^-$, $SnCl_6^-$, or $BiCl_5^-$; the anion of an organic sulfonic acid such as benzene sulfonic acid, dodecylbenzene sulfonic acid, or 3-nitrobenzene sulfonic acid; or the anion of a perfluoroalkylsulfonic acid, for example perfluorobutanesulfonic acid, perfluoroethanesulfonic acid, or perfluorooctanesulfonic acid.

More specific examples of suitable onium salts are diaryliodonium salts of sulfonic acid; diaryliodonium salts of boronic acids, for example tolyl cumyliodonium tetrakis (pentafluorophenyl) borate; bis(dodecyl phenyl) iodonium hexafluoroarsenate; bis(dodecylphenyl) iodonium hexafluoroantimonate; dialkylphenyl iodonium hexafluoroantimonate; triarylsulfonium salts of sulfonic acid; triarylsulfonium salts of perfluoroalkylsulfonic acids; and triarylsulfonium salts of aryl sulfonic acids; or triarylsulfonium salts of perfluoroalkylsulfonic acids.

Suitable aromatic diazonium salts of complex halides, include, for example, 2,4-dichlorobenzenediazonium tetrachloroferrate(III), p-nitrobenzenediazonium tetrachloroferrate(III), p-morpholinobenzenediazonium tetrachloroferrate(III), 2,4-dichlorobenzenediazonium hexachlorostannate(IV), p-nitrobenzenediazonium hexachlorostannate(IV), 2,4-dichlorobenzenediazonium tetrafluoroborate, or a combination comprising at least one of the foregoing salts.

Also preferred are certain metallocenes, for example the ferrociniums having the formula $[R^a(Fe^{11}R^b)_c]_d^{+c}[x]_c^{-d}$, wherein, c is 1 or 2; d is 1, 2, 3, 4 or 5; X is a non-nucleophilic anion, for example $BF_4^-$, $PF_6^-$, $AsF_6^-$, $SbF_6^-$, $SbF_5(OH)^-$, $CF_3SO_3^-$, $C_2F_5SO_3^-$, $n-C_3F_7SO_3^-$, $n-C_4F_9SO_3^-$, $n-C_6F_{13}SO_3^-$, $n-C_8F_{17}SO_3^-$, $C_6F_5SO_3^-$, phosphorus tungstate, or silicon tungstate; $R^a$ is a pi-arene, and $R^b$ is an anion of a pi-arene, especially a cyclopentadienyl anion. Examples of preferred pi-arenes are toluene, xylene, ethylbenzene, cumene, methoxybenzene, methylnaphthalene, pyrene, perylene, stilbene, diphenylene oxide and diphenylene sulfide, wherein cumene, methylnaphthalene, or stilbene are preferred. An example of vislible light a cationic photoinitiator is ($\eta_5$-2,4-cyclopentadien-1-yl) ($\eta_6$-isopropylbenzene)-iron(II) hexafluorophosphate, available under the trade name IRGA-CURE 261 from Ciba.

In order to increase the light efficiency, or to sensitize the cationic photoinitiator to specific wavelengths, it is also possible, depending on the type of initiator, to use sensitizers. Examples are polycyclic aromatic hydrocarbons or aromatic keto compounds, for example benzoperylene, 1,8-diphenyl-1,3,5,7-octatetraene, or 1,6-diphenyl-1,3,5-hexatriene. A factor in the choice of sensitizer is the nature and primary wavelength of the source of the radiation.

Free radical curable resins generally have, on average, at least two ethylenically unsaturated groups per molecule bound, for example, to an aliphatic, aromatic, cycloaliphatic, araliphatic, or heterocyclic structure; or to an oligomer or polymer such as, for example, a polyether, polyolefin, polyester, polycarbonate, (meth)acrylic, or polyurethane. Suitable free radical curable resins include, for example, unsaturated polyesters, (meth)acrylate-functional resins such as (meth)acrylourethanes, vinyl ethers, vinyl esters, allyl ethers, allyl esters, or combinations comprising at least one of the foregoing. Preferably one or more of an unsaturated polyester is used together with a polyfunctional resin having at least two sites of unsaturation per molecule, for example a poly(meth)acrylourethane resin, divinyl ether resin, divinyl ester resin, diallyl ether resin, diallyl ester resin, or combinations thereof, as a crosslinking agent. The prefix (meth)- as used herein means acrylate, methacrylate, and mixtures thereof.

The unsaturated polyesters may be formed in a conventional manner from di- or polyfunctional carboxylic acids (or their anhydrides) and di- or polyhydric alcohols. The unsaturation is typically supplied by the carboxylic acid, although it is possible to supply it through the alcohol. Often, monohydric alcohols or monofunctional carboxylic acids (or their esters) are employed for chain termination purposes.

Suitable ethylenically unsaturated di- or polyfunctional carboxylic acids (or their anhydrides) include, for example, maleic anhydride, fumaric acid, itaconic anhydride, citraconic anhydride, mesaconic anhydride, aconitic acid, tetrahydrophthalic anhydride, nadic anhydride, dimeric methacrylic acid, and the like, with maleic anhydride, fumaric acid, or their mixtures being preferred. Often, aromatic and saturated acids are employed in conjunction with the unsaturated acids to reduce the density of the ethylenic unsaturation and provide the desired chemical and mechanical properties.

Suitable aromatic or saturated di- or polycarboxylic acids (or their anhydrides) include, for example, adipic acid, succinic acid, sebacic acid, malonic acid, glutaric acid, cyclohexane dicarboxylic acid, dodecane dicarboxylic acid, phthalic anhydride, isophthalic acid, terephthalic acid, tetrahydrophthalic acid, hexahydrophthalic acid, trimellitic acid, pyromellitic anhydride, and the like.

Suitable monofunctional acids for chain termination include, for example, acrylic acid, methacrylic acid, and the like.

Suitable di- or polyhydric alcohols include, for example, ethylene glycol, diethylene glycol, triethylene glycol, propanediol, butanediol, neopentyl glycol, cyclohexanedimethanol, hexanediol, 2-n-butyl-2-ethyl-1,3-propanediol, dodecanediol, bisphenol A, hydrogenated bisphenol A, trimethylol propane, pentaerythritol, and the like.

Exemplary unsaturated polyesters include the maleate diesters and fumarate diesters of Formulas (5) and (6) respectively:

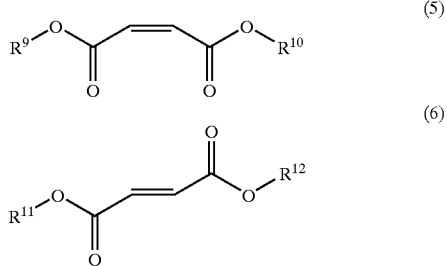

wherein $R^9$, $R^{10}$, $R^{11}$ and $R^{12}$ are each independently oligomers or polymers consisting of glycols and mono or polybasic acids.

Preferably, the unsaturated polyester resins are solid materials at room temperature, so that they can be easily formulated into powders or particulate form. Further, the preferred resins exhibit virtually no cold flow at temperatures up to 90° F. for desired long shelf life. They also have a glass transition temperature ($T_g$) and/or melting point ($T_m$) below the flow temperature required for preservation of heat sensitive substrates, preferably 160° F. to 300° F. The resins may be crystalline, semi-crystalline, or amorphous, or a combination of these forms may be used.

Suitable unsaturated polyester resins generally have a weight average (Mw) molecular weight of 400 to 10,000, preferably 1,000 to 4,500. The degree of unsaturation is typically 2 to 20 weight percent (wt. %), preferably 4 to 10 wt. %, based on the weight of the unsaturated polyester resin. Furthermore, whether the unsaturated polyester resin contains hydroxyl functional groups or acid functional groups depends upon the —OH/—COOH molar ratio of the monomer mix. Usually, the resins containing hydroxyl functional groups have a hydroxyl number of 5 to 100, while the resins containing acid functional groups have an acid number of 1 to 80.

As is known, vinyl ether resins having at least two vinyl ether groups as described above may polymerize by either a cationic or free radical mechanism. Irrespective of actual mechanism, where the coating powder contains a cationic curable resin such as an epoxy, any vinyl ether resin present will be considered to form part of the free radical curable resin for the purposes of this invention. Although vinyl ether resins having at least two vinyl ether groups may be used alone as the free radical curable resin, they are more commonly used together with another free radical curable resin, preferably a (meth)acrylate-containing resin or an unsaturated polyester resin as described above. A divinyl ether resin useful in the present invention is URACROS® ZW 3307, from DSM, N.V., The Netherlands.

Other suitable vinyl ether resins include, for example, divinyl ether terminated urethanes. These resins are usually available as crystalline resins formed from the reaction of vinyl ethers containing hydroxyl functional groups, such as hydroxybutyl vinyl ether, with crystalline diisocyanates, such as hexamethylene diisocyanate, hydrogenated methylenebis(cyclohexyl) diisocyanate, or biurets or uretdiones thereof. Amorphous vinyl ether terminated urethane resins can also be supplied by reacting non-crystalline isocyanates, such as isophorone diisocyanate, first with polyols, such as neopentyl glycol, and then reacting the product obtained with hydroxy vinyl ethers, such as hydroxybutyl vinyl ether.

A wide variety of (meth)acrylate-functional resins are suitable as the free radical curable resin, comprising, for example, an aliphatic, aromatic, cycloaliphatic, araliphatic or heterocyclic structure together with at least two (meth)acrylate groups. Exemplary useful structures are based on either monocylic phenols, for example on resorcinol or hydroquinone, or on polycyclic phenols, for example bisphenol F or bisphenol A. Methacrylate containing resins that further comprise unsaturated side chains, for example allyl, vinyl, or vinyl ether groups may be used.

In one preferred embodiment, a di(meth)acrylate terminate urethane is used in combination with the above-described unsaturated polyester resins. Again, these materials are usually crystalline resins formed by reacting hydroxyl-functional (meth)acrylates, such as hydroxyethyl methacrylate and hydroxypropyl methacrylate, with crystalline isocyanates. Amorphous resins may also be made in a similar manner as described for the amorphous vinyl ethers. These resins find particular utility as crosslinking agents for the unsaturated polyester resins described above.

Allyl ester resins may also be employed, such as the reaction product of allyl alcohol and crystalline or non-crystalline carboxylic acids (or their anhydrides), typically phthalic anhydride. Standard allyl ester resins include the reaction product of an allyl ester, such as allyl propoxylate, and a hydrogenated methylene diisocyanate. These resins find particular utility as crosslinking agents for the unsaturated polyester resins described above.

The relative amounts of unsaturated polyester resin to unsaturated co-polymerizable cross-linking resin in the coating powder will depend on the choice of materials employed. Generally, such materials are employed in stoichiometric equivalent amounts to allow cross-linking to proceed to substantial completion, although excess of either can be used if desired.

Suitable commercial embodiments of free radical curable resins include, for example, an unsaturated polyester resin commercially available under the trade name P-3125 from DSM, N.V., The Netherlands, and also under the trade name VAN-1743 from the Solutia; an acrylourethane resin commercially available under the trade name Viaktin 3546 from Solutia; PIOESTER 275, PIONEER P-1942, and P-1937, all from Pioneer Plastics, Auburn, Me.; ATLAC 363E, ATLAC 352, and DION 6694 ES, all from Reichold, Research Triangle Park, N.C.; and the unsaturated polyester resin available under the trade name Viaktin® 3890 from Solutia.

Suitable free radical photoinitiators for use in the coating powder according to the present invention include, for example, alpha-cleavage photoinitiators, hydrogen abstraction photoinitiators, and the like. Suitable alpha-cleavage photoinitiators include, for example, benzoin, benzoin ethers, benzil ketals such as benzil dimethyl ketal, monoacyl phosphines, bisacylphosphine oxides such as diphenyl (2,4,6-trimethyl benzoyl) phosphine oxide, aryl ketones such as 1-hydroxy cyclohexyl phenyl ketone, and the like. Other examples of free radical photoinitiators include benzophenones, or acetophenone derivatives, such as alpha-hydroxyalkylphenylketones. Examples of radical photoinitiators useful in the present invention are 1-hydroxycyclohexyl phenylketone, available under the trade name IRGACURE 184®; 2,2-dimethoxy-2-phenyl acetophenone, available under the trade name IRGACURE 651®; or 4-(2-hydroxy-ethoxy)phenyl-2-hydroxy-2-methylpropane-1-one, available under the trade name IRGACURE® 2959, each from Ciba-Geigy, Tarrytown, N.Y. Suitable hydrogen abstraction photoinitiators include, for example, Michler's ketone, and a dimethoxy phenyl acetophenone photoinitiator available under the trade name IRGACURE® 651 from Ciba-Geigy.

An effective total photoinitiator content of the powder coating can be readily determined by one of ordinary skill in the art, depending upon the types of free radical curable resins and cationic curable resins employed, amounts of each polymer resin in the coating powder, the amount of other constituent components, and the other properties desired in the coating. In general, however, an effective quantity of the total amount of both the cationic photoinitiator and free radical photoinitiator is 0.1 to 10 phr, preferably 0.5 to 7.5 phr, and most preferably 1 to 3 phr. Alternatively, or in addition, the amount of the cationic photoinitiator and free radical photoinitiator may be adjusted based on the total amount of each type of resin in the coating powder. Thus, an effective amount of cationic photoinitiator is generally 0.1 to 10 phr, preferably 0.5 to 7.5 phr, and most preferably 1 to 5 parts by weight per hundred parts by weight of the total amount of the cationic curable resin. An effective amount of free radical photoinitiator is generally 0.1 to 10 phr, preferably 0.5 to 7.5 phr, and most preferably 1 to 3 parts by weight per hundred parts by weight of the total amount of the free radical curable resin.

Preferably, the components of the coating powder are utilized in the solid phase to avoid potential processing difficulties. For example, particles containing any excess solvent may experience clumping, thus impeding the processing and application of the coating powder to the substrate. Generally, some of the above-mentioned photoinitiators are supplied by commercial vendors in the form of approximately 50% solids in a solvent. To most effectively utilize these photoinitiators, including all other components contained in solvent, these components undergo preliminary evaporation or other processing steps to convert these materials to powder or particulate form.

To enhance the cross-linking rate during cure, thermal catalysts may optionally be employed. The inclusion of thermal free-radical initiators has been found to assist in curing near the substrate, particularly when pigmented, opaque, or thick film coatings are desired. Suitable catalysts include, for example, peroxides such as peroxy ketals such as 1,1-bis(t-butyl peroxy)-3,3,5-trimethylcyclohexane, diacylperoxides such as benzoyl peroxide, peroxy esters and peroxy carbonates; and transition metal compounds based on fatty acids, oils, or tertiary amines, preferably cobalt soaps, such as cobalt octoate, cobalt neodecanoate, cobalt naphthenate, cobalt octadecanoate, and magnesium salts. An effective amount of catalyst can be readily determined by one of ordinary skill in the art, depending upon the amount of cross-linking desired, types of free radical curable resins and cationic curable resins employed, and amounts of each polymer system in the coating powder. In general, an effective quantity of peroxide catalyst is 0.01 to 5 phr, preferably 0.05 to 3 phr, most preferably greater than or equal to 0.1 to 2 phr, or a range of 0.5 phr to 2 phr. In addition, effective quantities of metal catalyst are 0.01 to 1 phr, preferably 0.05 to 0.75 phr, and most preferably 0.1 0.5 phr, or 0.05 phr to 1 phr.

Additives to aid or enhance the chemical and physical properties of the powder coating may be included such as pigments, fillers, flow control agents, dry flow additives, anticratering agents, surfactants, texturing agents, light stabilizers, plasticizers, degassing agents, wetting agents, anti-oxidants, and the like.

Suitable pigments include, for example, titanium dioxide, iron oxide red, iron oxide yellow, phthalocyanine green, phthalocyanine blue, blue tone phthalocyanine green, yellow tone phthalocyanine green, green tone phthalocyanine blue, lamp black, carbon black, or combinations comprising at least one of the foregoing pigments. Suitable fillers include, for example, calcium carbonate, barium sulfate, wollastonite, mica, china clay, diatomaceous earth, benzoic acid, low molecular weight nylon, or combinations comprising at least one of the foregoing fillers.

The amount of fillers and/or pigments can be readily determined by one of ordinary skill in the art, depending upon the desired film opacity and coloration of the resultant coating. In general, effective quantities of fillers and/or pigments are 0 up to 120 phr, preferably 1 to 90 phr. In a preferred embodiment, the low gloss powder coatings are clear to translucent and contain an accordingly low proportion of pigment, e.g. from 0 to 60 phr, or they contain a clear to translucent filler, pigment or colorant in the amount of 0 to 120 phr.

Suitable flow control agents include, for example, acrylic resins, silicone resins, combinations comprising at least one of the foregoing flow control agents, and the like. A suitable flow control agent for use in the present invention is RESIFLOW® P-67, an acrylate flow modifier, from Estron, Calvert city, Ky. Suitable dry flow additives include, for example, fumed silica, alumina oxide, and the like, or combinations comprising at least one of the foregoing dry flow additives. Suitable anticratering agents include, for example, benzoin, benzoin derivatives, low molecular weight phenoxy and phthalate plasticizers, and the like, or combinations comprising at least one of the foregoing anticratering agents. Suitable surfactants include, for example, acetylenic diol, and the like. Suitable texturing agents include, for example, organophilic clays, crosslinked rubber particles, and the like, or combinations comprising at least one of the foregoing texturing agents. Suitable light stabilizers include, for example, hindered amines, hindered phenols, or combinations comprising at least one of the foregoing light stabilizers. The amount of flow control agents, dry flow additives, anticratering agents, surfactants, texturing agents, and/or light stabilizers can be readily determined by one of ordinary skill in the art, depending upon the desired physical properties of the resultant coating. In general, effective quantities of flow control additives, dry flow additives, anticratering agents, texturing agents, surfactants, or light stabilizers are individually 1 to 15 phr.

The coating powder is produced using conventional techniques. In one exemplary manner of proceeding, the free radical curable resin, the cationic curable resin, the cationic photoinitiators, the free radical photoinitiator, and optional cross-linking agent, thermal catalyst, and any other additives are mixed together, e.g., dry blended in the appropriate amounts. In general, the coating powder uses a ratio of the free radical curable resin to cationic curable resin of 95:5 to 5:95 on a weight basis. The mixture is then melt blended in an extruder with heating, preferably above the melting point but below the decomposition or reaction temperature of the resins. The extruded composition is rapidly cooled and broken into chips, and then ground, preferably with cooling. As necessary, the particulates are sorted according to size. Average particle size is typically 20 to 60 microns. Optionally, gaseous or supercritical carbon dioxide may be charged to the extruder, if necessary, to lower extrusion temperatures.

In another exemplary method, the coating powder is produced by compounding the free radical curable resin, and optionally any cross linking agent, thermal catalyst, or other additive, for example by mixing, extruding, cooling, breaking, and grinding these components into particulate form. Likewise, the cationic curable resin, cationic photoinitiator, and optionally any cross-linking agent, thermal catalyst, or other additive, are mixed, extruded, cooled, broken, and ground into particulate form. The particulate free radical curable and particulate cationic curable resin compositions are then dry blended together in a ratio of 95:5 to 5:95 on a weight basis to form the coating powder.

In a preferred embodiment of the present invention, the coating powder is jet milled or finely ground in an air classifying mill to an average particle size, as determined by laser light scattering, of 5 to 30 micrometers, preferably from 8 to 25 micrometers, more preferably 8 to 20 micrometers, and most preferably 8 to 16 micrometers for example by a Malvern Instruments APA-2000 Sizer unit. The small particle size provides exceptionally smooth coatings for use as translucent or clear coatings on hardwood substrates such as maple, oak, walnut, mahogany, or cherry. Further, the reduced particle size enables the provision of thinner coating films, having improved smoothness and reduced outgassing.

To make a powder coating in accordance with the present invention, may be applied to substrates by a variety of means, including, for example, electromagnetic brushes, fluidized beds, for example electrostatic fluidized beds, electrostatic spray guns, triboelectric guns, and the like, to an optionally pre-treated or primed substrate to be coated. In electrostatic methods the powder coating particles are electrostatically charged and the substrate is grounded or oppositely charged. Electrostatic spray booths may be employed that house banks of corona discharge or triboelectric spray guns and recirculators for recycling over sprayed powders back into the powder feed.

The types of substrate is not particularly limited, and includes both heat-resistant substrates, such as metal, glass, steel, ceramic, carbon and graphite, and heat-sensitive substrates. Examples of heat-sensitive substrates include wood, such as hardwood, hard board, laminated bamboo, wood composites, such as particle board, electrically conductive particle board, high, medium, or low density fiber board, masonite board, laminated bamboo, and other substrates that contain a significant amount of wood. These substrates may be filled, pre-treated, or primed with ultraviolet radiation curable liquids, powder primers, or solvent or waterborne coatings, such as antistatic agents to improve smoothness and reduce the required film buildups. Any solvent or water present on a substrate may be heat flashed off in the manner described in heat fusion prior to powder coating. Other suitable heat-sensitive substrates include, for example, plastics such as acrylonitrile butadiene styrene polymer resins (ABS), polyphenylene ether resins (PPO), sheet molded components (SMC), polyolefins, polycarbonates, acrylics, nylons, and other copolymers which usually will warp or outgas when coated and heated with traditional heat curable coating powders, along with paper, cardboard, and composites and components having a heat-sensitive aspect.

After it is coated on a substrate, the coating powder layer may be flowed out by exposure to infrared (IR) to create a coating having a more consistent profile.

Next, the coating powder layer is exposed to an amount of heat effective to fuse (i.e., melt) the powders into a continuous, smooth, molten film. The substrate may be heated at the time of application (pre-heated) and/or subsequently (post-heated) to effect heat fusion and film formation. Heating is performed in infrared, convection ovens, or a combination of both. When coating heat sensitive substrates, such as wood articles, pre-heat and post-heat steps are normally employed to enable faster melt and flow out. With plastic articles, only a post-heat step is usually performed to limit heat exposure and avoid plastic deformation.

Generally, heat fusion proceeds for a time effective to outgas substrate volatiles, which prevents surface defects such as blisters, craters, and pinholes from forming during curing. Preferably, the flow viscosity of the powder coating composition is sufficiently low to produce a smooth coating on the substrate. In accordance with the present invention, coated powders are heat fused for 10 seconds to 10 minutes, preferably 20 seconds to 5 minutes, and most preferably 30 seconds to 3 minutes. Shorter heat fusion times are needed as the temperature of heat fusion is increased. In accordance with the present invention, coated powders are heat fused at 120 to 350° F. (49 to 177° C.), preferably 150 to 300° F. (65 to 149° C.), and most preferably 180 to 270° F. (82 to 132° C.). For example, powder coatings may be heat fused at 250° F. (121° C.) to 270° F. (132° C.) for 1 minute.

After the coating powder is heat fused onto the substrate, it may be allowed to cool. It is then exposed to a radiation source effective to activate the photoinitiators, preferably both photoinitiators simultaneously. Preferably, exposure is to a standard ultraviolet light source, such as a standard medium pressure mercury-vapor lamp, iron doped mercury-vapor lamp, and/or gallium doped mercury-vapor lamp, e.g., 600-watt Fusion H-, D- and/or V-lamps, respectively, to rapidly cure the coating films into smooth, hardened, low gloss finishes. Visible light or electron beam radiation may be used instead of UV radiation, if desired. Activation and cure of the free radical and cationic initiators in the coating typically takes 1 millisecond to 10 seconds, and typically less than 3 seconds, depending on the particular compositions and photoinitiators.

Coating powders are generally applied to achieve a powder coating thickness of 0.5 mil (0.0122 millimeters, "mm") to 25 mils (0.635 mm), preferably 1.5 to 10 mils (0.038 to 0.245 mm), more preferably 1.0 to 4 mils (0.0245 mm to 0.102 mm). As mentioned above, the coatings are smooth, and have low gloss without use of matting agents that can disrupt the surface to the coating. They are also curable at very low temperatures, for example 150 to 180° F. (65.6 to 82.2° C.). In one preferred embodiment, the coating powder comprises 5 to 95 parts by weight of one or more than one cationic curable epoxy resin; one or more than one cationic cure initiator; one or more than one free radical photoinitiator; and 5 to 95 parts by weight of one or more than one free radical curable unsaturated polyester resin and a polyfunctional (meth)acrylate-functional resin, vinyl ether resin, vinyl ester resin, allyl ether resin, allyl ester resin, or combination comprising a mixture of one of the foregoing polyfunctional resins. In another preferred embodiment, the coating powder comprises one or more than one cationic curable epoxy resin; one or more than one cationic cure initiator; one or more than one free radical curable unsaturated polyester resin; one or more than one divinyl ether resin; and one or more than one free radical photoinitiator, wherein the weight ratio of epoxy resin to unsaturated polyester resin plus divinyl ether resin is 95:5 to 5:95, preferably, 80:20 to 20:80, more preferably 60:40 to 40:60. In another preferred embodiment, the foregoing coating powders further comprises a thermal cure catalyst.

Some embodiments of the invention will now be described in detail in the following Examples. As used herein, unless otherwise indicated, the phrase "per hundred parts resin" or "phr" means the amount, by weight, of an ingredient per hundred parts, by weight, of the total amount of resin contained in a coating powder, including crosslinking resins.

Gloss was measured at 60° according to a modified version of ASTM D 523 by using a BYK Gardner Micro TRI gloss meter.

Methyl ethyl ketone resistance (MEK resistance), a rating of solvent resistance and an indication of crosslink density, was measured as follows. A cotton swab was soaked in MEK and rubbed with moderate pressure in a back and forth stroking motion (a "double rub") 50 times. A relative rating was given on a scale of 1–5 with a rating of 5 defined as the most solvent resistant and a rating of 1 justified when the coating can be completely removed during the process to expose bare substrate. More specifically, a rating of 5 corresponds to no rub off, 4 to slight rub off, 3 to moderate rub off, 2 to severe rub off, and 1 to complete rub through to substrate.

EXAMPLE 1

A coating powder comprising the components in the amounts shown in Table 1 was prepared. The components were compounded and extruded using a PR-46 Buss co-kneader extruder at a temperature of 25° C. The extrudate was ground using a Brinkman grinder, and then screened through a 140 mesh to remove coarse particles.

TABLE 1

| Component | Parts Per Hundred Resin (phr) |
| --- | --- |
| Bisphenol A epoxy | 40 |
| Unsaturated Polyester | 41.5 |
| Urethane divinyl ether | 18.5 |
| Diphenyl iodonium hexafluoroantimonate | 1.0 |
| Dimethoxy phenylacetophenone | 1.0 |
| Acrylic oligomer | 1.0 |
| Titanium dioxide | 25.0 |
| Bisacylphosphine oxide | 2.0 |

Meanwhile, a medium density fiberboard substrate was preheated for 2 minutes at 375° F. (191° C.). The coating powder was electrostatically applied to the substrate, followed by post heating for 1 minute using 50% infrared heat (450° F., 232.2° C.). The coating powder was then cured by exposure to a 600 watt V/H lamps for 1 second to form a powder coating having the following characteristics as shown in Table 2:

TABLE 2

| Test | Results |
| --- | --- |
| 60° Gardner Gloss | 21 units |
| MEK Resistance (50 double rubs) | Moderate Rub Off |

As shown in Table 2, the free radical curable resins, cationic curable resin, and photoinitiators were compounded at the same time, along with the other components to form the coating powder. The coating powder of Example 1 can be applied at both lower preheat and post heat temperatures, as well as cured by ultraviolet light at lower cure temperatures, than a thermally cured coating powder. The resulting powder coating possesses a low gloss finish as measured on a 60° Gardner Gloss scale. In contrast, a thermally cured coating according to U.S. Pat. No. 5,714,206 would require a preheat of 10 minutes at 375° F. (190.6° C.) and a postheat of 5 minutes at 375° F. (190.6° C.) on one inch MDF, and would yield similar results as above but require much higher temperatures.

EXAMPLE 2

In this example the free radical curable components (Part A as shown in Table 3 below) were compounded (mixed, melt blended, extruded, and ground as described in Example 1) separately from the cationic curable components (Part B). The two powders were then blended in a 50:50 ratio by weight to form a coating powder.

TABLE 3

| Component | Part A<br>Free Radical<br>Cure System<br>(parts by weight) | Part B<br>Cationic Cure System<br>(parts by weight) |
| --- | --- | --- |
| Unsaturated Polyester | 83 | — |
| Urethane divinyl ether | 17 | — |
| Bisphenol A epoxy | — | 85 |
| Divinyl terephthalate | — | 15 |
| Bisacylphosphine oxide | 2 | — |
| Diphenyl iodonium $SbF_6^-$ | — | 0.2 |
| Acrylic oligomer | 1.5 | 1.5 |
| Titanium dioxide | 25 | — |

The coating powder was electrostatically applied to medium density fiberboard that had been was preheated for 2 minutes at 400° F. in a convection oven. The coating was then post heated for 30 seconds at 50% infrared heat to a temperature of 270° F., and then cured by passing it under 600 watt V/H lamps for one second at a speed of at 20 feet per minute to form a powder coating.

The resulting powder coating possessed the following characteristics as shown in Table 4:

TABLE 4

| Test | Results |
| --- | --- |
| 60° Gardner Gloss | 42 units |
| MEK Resistance (50 double rubs) | (Slight Rub Off) |

When the free radical curable resin and cationic curable resom were individually compounded with their respective photoiniators and then blended, the coating powder can also be applied at both lower preheat and post heat temperatures, as well as cured by ultraviolet light at lower cure temperatures, than a thermally cured coating powder. The resulting powder coating possesses a low gloss finish as measured on a 60° Gardner Gloss scale.

EXAMPLE 3

Part A and Part B as shown in Table 5 were compounded separately as described in Example 2 then blended in a ratio of 60:40 by weight.

TABLE 5

| Component | Part A Free Radical Cure System (Parts by weight) | Part B Cationic Cure system (Parts by weight) |
|---|---|---|
| Unsaturated Polyester | 80 | |
| Divinyl ether | 20 | |
| Benzyl Ketal Photoinitiator | 2 | |
| Dimethoxy phenylactophenone | 1 | |
| Acrylate flow modifier | 2 | |
| Bisphenol A epoxy resin | | 100 |
| Diphenyl iodonium (SbF$_6$) | | 1.5 |
| Acrylate flow Modifier | | 2 |

The resultant coating powder was then electrostatically applied to a 6×6×¾ inch (15×15×1.8 centimeter) block of maple hardwood that had been pre-treated with an antistatic spray static guard from Alberto Culver, followed by flashing off the antistatic spray for 15 seconds at 300° F. (149° C.). The coating was flowed out for 45 seconds in a Black Body Infrared device, followed by heat fusing the coating for 1 minute in a convection oven a 300° F. (149° C.). The coating was then UV cured by exposure to 600 Watt Mercury Vapor lamps for one second.

The following properties were obtained

TABLE 6

| Property | Result Obtained |
|---|---|
| Thickness | 2.0 to 2.5 mils |
| MEK resistance | Moderate rub off |
| 60° Gloss | 42 |
| Appearance | Slight Orange Peel |

The resulting coating has a low gloss and can provide a truly clear or translucent finish on a hardwood substrate.

EXAMPLE 4

The powder formulation used in Example 3 was processed and coated in the same way as in Example 3, except that, prior to applying the coating, the coating powder was finely ground in a jet mill or an Air Classifying Mill (Brinkmann Mill). The powder coatings had the properties shown in Table 7:

TABLE 7

| | Powder Grinding Step | |
|---|---|---|
| Property | Fluid Energy Model 00 microjet mill Grinding Nozzle 90 psi Pusher nozzle 40 psi | Brinkman Grind with a 0.5 mesh screen, 12 pin rotor, then High speed Screened, 270 mesh |
| Thickness | 0.8–0.9 mils | 1.4–1.7 mils |
| Appearance | No orange peel | Slight orange peel |
| 60 degree gloss | 19 | 14 |
| MEK resistance (50 double rubs) | Slight rub off | Slight Rub Off |
| Average particle size | 9.25 microns | 23.5 microns |

As can be seen in Example 4, finely grinding a powder prior to coating a substrate provides a UV cured coating which has a very low gloss, good to excellent smoothness (appearance), and a remarkable MEK resistance for a UV cured clear powder coating on hardwood.

What is claimed is:

1. A coating powder, comprising:
   one or more than one cationic curable resin chosen from aromatic epoxides polyglycidyl compounds having an aromatic structure, epoxy novolac resins, epoxy cresol resins, vinyl ethers, oxetanes oxolanes, cyclic acetals, thiiranes, thiotanes, and combinations thereof;
   one or more than one cationic photoinitiator;
   one or more than on free radical curable resin;
   one or more than one free radical photoinitiator; and
   optionally, a thermal cure catalyst, wherein the one or more than one cationic curable resin and the one or more than one free radical curable resin are each present in a ratio of 5:95 to 95:5 by weight and,
   further wherein, when the said one or more than one cationic curable resin is chosen from aromatic epoxides, polyglycidyl compounds having an aromatic structure, epoxy novolac resins, and epoxy cresol resins, the amount said aromatic epoxides ranges from 20 to 80 parts per hundred resin (phr).

2. A coating powder as claimed in claim 1, comprising one or more than one cationic curable resin chosen from aromatic epoxide resin, a polyglycidyl compound having an aromatic structure, epoxy novolac resin, and epoxy cresol resin; and one or more than one free radical curable unsaturated polyester resin and a polyfunctional (meth)acrylate-functional resin, vinyl ether resin, vinyl ester resin, allyl ether resin, allyl ester resin, or combination comprising a mixture of one of the foregoing polyfunctional resin.

3. A coating powder as claimed in claims 1 or 2, wherein the said vinyl ether resin is one or more divinyl ether resins.

4. The coating powder as claimed in claims 1 or 2, wherein the coating powder has an average particle size of 5 to 30 microns.

5. A method for making a coating having a low gloss finish, comprising:
   disposing a layer of a coating powder onto a substrate, wherein said coating powder comprises
   one or more than one cationic curable resin chosen from aromatic epoxides, polyglycidyl compounds having an aromatic structure, epoxy novolac resins, epoxy cresol resins, vinyl ethers, oxetanes, oxolanes, cyclic acetals, thiiranes, thiotanes, and combinations thereof;
   one or more than one cationic photoinitiator;
   one or more than one free radical curable resin; and one or more than one free radical photoinitiator; wherein the said cationic curable resin and the said free radical curable resin are each present in a weight ratio of 95:5 to 5:95 and further wherein, when the said one or more cationic curable resin is chosen from aromatic epoxides, polyglycidyl compounds having an aromatic structure, epoxy novolac resins, and epoxy cresol resins the amount of the said aromatic epoxides ranges from 20 to 80 parts per hundred resin (phr):

fusing the disposed coating powder with heat to form a powder coating; and curing said powder coating to achieve a gloss level of from 1 to 50 on a 60° Gardner Gloss scale.

6. The method for making a coating as claimed in claim 5, wherein the coating powder is formed by blending a coating powder comprising the one or more than one cationic curable resin and the one or more than one cationic photoinitiator with a coating powder comprising the one or more than one free radical curable resin and the one or more than one free radical photoinitiator.

7. A method for making a coating as claimed in claim 6, wherein the coating powder has an average particle size of 5 to 30 microns.

8. The method as claimed in claims 6 or 7, wherein the substrate comprises wood, hardwood, hard board, laminated bamboo, wood composites, particle board, electrically conductive particle board, high density fiber board, medium density fiber board, low density fiber board, masonite board, laminated bamboo, acrylonitrile butadiene styrene copolymers, polyphenylene oxide copolymers, sheet molded components, polyolefins, polycarbonates, acrylics, nylons paper, cardboard, metal, glass, steel, ceramic, carbon, graphite, or a combination comprising at least one of the foregoing substrates.

9. The method as claimed in claim 7, wherein the substrate is hardwood.

10. A powder coated article formed according to the method as claimed in any one of claims 5, 6 or 7.

* * * * *

UNITED STATES PATENT AND TRADEMARK OFFICE
CERTIFICATE OF CORRECTION

PATENT NO. : 6,777,027 B2
DATED : August 17, 2004
INVENTOR(S) : Andrew T. Daly et al.

Page 1 of 1

It is certified that error appears in the above-identified patent and that said Letters Patent is hereby corrected as shown below:

Column 16,
Line 25, after "aromatic epoxides", please insert a comma -- ,--;
Line 63, after "oxetanes", please insert a comma -- , --; and Column 18,
Line 8, after "the amount" please insert -- of the --.

Signed and Sealed this

Thirtieth Day of November, 2004

JON W. DUDAS
*Director of the United States Patent and Trademark Office*